United States Patent [19]

Ito et al.

[11] 3,989,545

[45] Nov. 2, 1976

[54] SEPARATORS FOR A STORAGE BATTERY

[75] Inventors: Takashi Ito, Toyonaka; Hironori Matsui, Hirakata, both of Japan

[73] Assignees: Kanebo, Ltd., Tokyo; Matsushita Electric Industrial Co., Ltd., Kodama, both of Japan

[22] Filed: Apr. 7, 1975

[21] Appl. No.: 565,350

[30] Foreign Application Priority Data
Apr. 11, 1974  Japan.............................. 49-41305

[52] U.S. Cl. ............................................. 429/246
[51] Int. Cl.² ......................................... H01M 2/14
[58] Field of Search ........... 136/146, 148, 145, 163; 427/442, 443; 428/266

[56] References Cited
UNITED STATES PATENTS

| | | | |
|---|---|---|---|
| 2,588,365 | 3/1952 | Dennett | 428/206 |
| 2,803,690 | 8/1957 | Stevens | 136/163 |
| 3,563,802 | 10/1968 | Ogden | 136/146 |
| 3,811,957 | 5/1974 | Buntin | 136/148 |
| 3,853,601 | 12/1974 | Taskier | 136/146 |

*Primary Examiner*—Donald L. Walton
*Attorney, Agent, or Firm*—Paul & Paul

[57] ABSTRACT

Separators for a lead-acid storage battery are provided which are composed of a fibrous structure such as non-woven fabric, paper, woven or knitted fabric which is impregnated with 1 to 50% by weight, based on the weight of the fibrous structure not yet coagulated, of an organopolysiloxane and then cured.

7 Claims, No Drawings

SEPARATORS FOR A STORAGE BATTERY

The present invention relates to separators placed in storage batteries, particularly lead-acid storage batteries.

The term "separator" used herein should be interpreted in a broad sense and includes not only a separator in a narrow sense but also a so-called retainer or spacer. That is, this term means porous plate used to prevent direct contact between plates of opposite polarity while freely permitting electrolytic conduction.

Various separators have been heretofore proposed. However, these separators have both merits and demerits. For example, separators made of a sheet of cellulose linter pulp treated with a thermosetting resin, e.g., a phenolformaldehyde resin, or of a plate of a porous rubbery material, are widely used in combination with a glass matt retainer. However, the cellulose linter pulp separators result in a storage battery with a relatively high internal electrical resistance and particles of the anode active material tend to pass therethrough, hence depositing in the separators, and the active material tends to come off of the positive plate. Separators of microporous rubbery material also result in a storage battery with a relatively high internal electrical resistance, although these separators possess good resistance to acid and oxidation. Glass mats are poor in preventing the anode active material from coming off or dislodging from the positive plate, although glass mats also possess good resistance to acid and oxidation.

Among known separators, those made of papers of cured phenolformaldehyde fibers, which are disclosed in U.S. Pat. No. 3,563,802 and our copending U.S. Pat. application No. 442,271, now U. S. Pat. No. 3,910,799, are relatively satisfactory because these separators are advantageous in acid resistance and many other performances required for storage batteries. However these separators are not completely satisfactory because the capacity of the battery decreases after the battery is used for a long period of time.

It is a main object of the present invention to provide separators which exhibit good performances and are superior particularly in acid and oxidation resistance and, accordingly, result in a lead-acid storage battery of an improved service life over that of previous lead-acid batteries.

Other objects and advantages of the present invention will be apparent from the following description.

In accordance with the present invention, there is provided separators having microporous openings, each separator being placed between the alternate positive and negative plates in the cells of a lead-acid storage battery, and being composed of a fibrous structure of organic high polymer fibers which is impregnated with 1 to 50% by weight, based on the weight of the fibrous structure not yet impregnated, of an organopolysiloxane and then cured.

By the term "fibrous structure" used herein is meant woven or knitted fabrics and paper and other non-woven fabrics, containing at least 20% by weight of organic fibers. The fibrous structure may contain, in addition to organic fibers, other fibers such as inorganic fibers, for example, glass fibers and/or binder or filler such as finely divided silica or diatomaceous earth. The organic fibers used for the manufacture of such fibrous structure are not critical and may be natural fibers such as cellulose and wool or synthetic polymer fibers such as a phenolformaldehyde resin fiber, a polyester fiber, a polyamide fiber and a polyacrylonitrile fiber, or a mixture thereof. The fibers should preferably have a high resistance to electrolyte solution. Most preferable is a cured phenolformaldehyde resin fiber of approximately 0.1 to approximately 5 microns in diameter. The phenolformaldehyde resin fiber is in general prepared by the following procedure. A novolak type phenolformaldehyde resin is melt-extruded through an orifice into a non-oxidizing atmosphere such as a nitrogen atmosphere while non-oxidizing gas is blown along the extruded melt resin which is not yet coagulated, i.e. immediately after extrusion from the orifice. The melt resin as extruded is blown and torn off by the blown gas and formed into fine fibers or short lengths. These fibers are then subjected to curing to effect crosslinking in the polymer molecule. Curing may be performed, for example, by treating the fibers with a crosslinking agent such as formaldehyde at a temperature of 60° to 105° C for 1 to 20 hours, in the presence of an acid catalyst such as sulfuric acid and hydrochloric acid.

A most preferable fibrous structure placed in close contact with the positive plate as a separater is a sheet or paper made from the aforesaid cured phenolformaldehyde resin fibers of 1 to 5 microns diameter by either a wet or a dry sheet-making process. Such sheet or paper impregnated with an organopolysiloxane and cured is advantageous not only in improved resistance to acid and oxidation but also in the following points.

1. Internal electrical resistance of the storage battery provided with the separators is low.
2. The separators have a plurality of micro-porous openings of a size sufficiently small to prevent particles of the anode active material from depositing in such openings and the deposits from growing through the separator to cause a short circuit between adjacent plates.
3. The separators prevent the anode active material from coming off or dislodging from the positive plate.
4. The separators have a structure such that the electrolyte solution, i.e. sulfuric acid, is capable of readily permeating the separators.
5. The separators have a mechanical strength sufficiently high to withstand shock or other external forces imposed thereon during construction and use of the battery. The thickness of the separators may be one third to one half of conventional cellulose separators or rubbery material separators.

A most preferable fibrous structure placed in close contact with the positive plate as a retainer is a non-woven fabric or a woven or knitted fabric impregnated with an organopolysiloxane and then cured. Such fabric exhibits a high resistance to acid and oxidation similar to that of a conventional glass fiber mat retainer. The fabric may have microporous openings of a size sufficiently small to prevent particles of the anode active material from coming off or dislodging from the positive plate, although a conventional glass fiber mat possesses porous openings of a larger size. Further, the electrolyte solution is retained better within the fabric than within the glass fiber mat.

Organopolysiloxane used for impregnating the fibrous structure is a compound having a chemical structure composed of at least two constituent units selected from the following units:

i. monofunctional unit

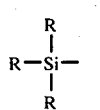 and/or 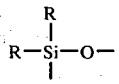

ii. bifunctional unit

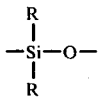

iii. trifunctional unit

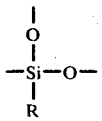

where R is hydrogen or an alkyl or aryl group. The organopolysiloxane may be either oily, rubbery or resin-like, which are popularly called silicone oil, silicone rubber or silicone varnish, respectively. It includes, for example, methylhydrogenpolysiloxane, dimethylpolysiloxane and phenylmethylpolysiloxane. Preferable are silicone oils, which are commercially available as water repelling agents and releasing agents and consist essentially of methylhydrogenpolysiloxane or a mixture of methylhydrogenpolysiloxane and dimethylpolysiloxane, because these organopolysiloxanes are easy to deal with and capable of being cured at a moderate temperature.

The amount of organopolysiloxane deposited on the fibrous structure is within the range of 1 to 50% by weight, preferably 3 to 30% by weight and more preferably 5 to 20% by weight, based on the weight of the fibrous structure not yet impregnated therewith. When the amount of the organopolysiloxane is in excess of the above, the microporous openings of separators are liable to get clogged and the electrical resistance increases. In contrast, when the amount thereof is too small, the desired effect is not obtainable.

The manner whereby the fibrous structure is impregnated with organopolysiloxane is not critical. Organopolysiloxane may be used in the form of either an aqueous emulsion or a solution in a suitable organic solvent.

The fibrous structure impregnated with organopolysiloxane is cured by heating, usually at temperatures of 120° C to 200° C for a period of 30 seconds to ten minutes. It is preferable to use a catalyst in order to effect the curing at a relatively low temperature and for a relatively short period time. Known catalysts may be used such as dibutyltin diacetate. It is further preferable to use a crosslinking agent to form a bond between the fibrous structure and the organopolysiloxane. Known crosslinking agents may be used such as γ-aminopropyl-triethoxysilane.

It is unexpected that separators impregnated with an organopolysiloxanes and then cured, exhibit improved resistance to the oxidation due to the anode active material, i.e. $PbO_2$, and the nascent oxygen evolved at the end of charge and do not badly influence the other performances of the storage battery; although it is well known that fibrous structures impregnated with an organopolysiloxane exhibit good water repellency and elastic recovery, and that a cured organopolysiloxane possesses good resistance to heat and various chemicals.

The separators of the invention used in a lead-acid storage battery can be thiner than conventional separators and, therefore, the distance between plates of opposite polarity can be shortened. Consequently, the capacity per unit volume of the lead-acid storage battery is large.

In order that the invention may be more fully understood the examples below are given by way of illustration only. In the examples, parts and percentages are by weight unless otherwise specified.

The performances of the sheet to be used as a battery separator were tested as follows. Electrical resistance was determined by the voltage drop method after immersing specimen sheet for 24 hours in aqueous sulfuric acid with a specific gravity (at 25°C) of 1,280 containing 0.2% of Sanmorin 11 (penetrating agent, trade name, supplied by Sanyo Kasei Kogyo K.K., Japan). Acid and oxidation resistance was determined by continuously applying an electric current at a current density of 0.1 A/cm² and at 50° C through the specimen sheet sandwiched between two lead plate electrodes placed in sulfuric acid with a specific gravity of 1.300, and measuring the time period required for the voltage between the electrodes to drop to a predetermined value. The acid and oxidation resistance was expressed in terms of the period of time so measured. Porosity was calculated from the following formula:

% porosity=$[1-(d'/d)] \times 100$ where $d'$ is an apparent specific gravity determined from apparent volume and weight of the specimen sheet and $d$ is a true specific gravity determined by using a Beckmann specific gravimeter.

EXAMPLE 1

A novolak resin having a molecular weight of 850, prepared by condensing phenol with formladehyde in a known manner, was extruded by a spirit-spinning apparatus through an orifice into an atmosphere of nitrogen. Fibers so prepared were of 0.1 to 5.0 microns in diameter and 0.1 to 5.0 mm in length. The fibers were immersed in a bath of 170 ml of 35% hydrochloric acid and 150 ml of a 30% aqueous formaldehyde solution at room temperature. Then, the bath was gradually heated to 95°C and maintained at that temperature for 3 hours to effect curing. The cured fibers were put into an aqueous solution containing small amounts of "Sizol" (trade name, a surface active agent supplied by Daiichi Kogyo Seiyaku K.K., Japan) and polyvinyl alcohol, followed by agitation to prepare a uniform dispersion of a 2 g/liter concentration. A sheet-like product was manufactured from the dispersion by using a TSS standard rectangular type sheet-making machine (Toyo Seiki Seisakusho., Japan). An aqueous 1% solution of resol resin was sprayed on the sheet and the sheet was dried. The resultant sheet was of a 120 g/m² basis weight and a 0.3 mm thickness.

The sheet was impregnated with an aqueous emulsion of a mixture comprising 60% of methylhydrogenpolysiloxane and 40% of dimethylpolysiloxane and small amounts of γ-amino-propyltriethoxysilane (crosslinking agent) and dibutyltin diacetate (catalyst). After being dried the sheet was heated at 180° C for 1 minute.

The sheet was tested for its performances. Results were as shown in Table I, below.

A lead-acid storage battery having a capacity of 4 A.hr at 10 hours' rate was constructed in a manner such that the sheet mentioned above was placed closely adherent to the positive plate and a glass fiber mat spacer was placed between the above sheet and the negative plate. The capacity of the battery was determined before and after 100, 200, 300 and 400 times repeated discharge and charge at 1 ampere. The results were as shown in Table II, below.

For comparison purposes, the above tests were repeated on two commercially available separators, one being a phenolformaldehyde resin impregnated cellulose sheet (X) of 0.8 mm thick and the other being a rubbery microporous plate (Y) of 0.5 mm thick.

Table I

| Separator | Amount of organopolysiloxane deposited (wt. %) | Electrical resistance ($\Omega/cm^2$/sheet) | Oxidation and acid resistance (hr.) | porosity (%) |
|---|---|---|---|---|
| A (control) | 0 | 0.05 | 15.3 | 65.5 |
| B " | 0.5 | 0.05 | 15.8 | 65.3 |
| C (Invention) | 1.2 | 0.06 | 28.1 | 65.2 |
| D " | 3.1 | 0.07 | 37.5 | 65.3 |
| E " | 5.0 | 0.07 | 41.5 | 64.7 |
| F " | 10.5 | 0.11 | 49.2 | 64.1 |
| G " | 21.3 | 0.15 | 58.7 | 62.6 |
| H " | 30.2 | 0.21 | More than 70 | 61.8 |
| I " | 49.5 | 0.35 | " | 59.5 |
| J " | 55.8 | 0.78 | " | 56.4 |
| X (Control) | — | 0.21 | 0.5 | 60.1 |
| Y " | — | 0.25 | More than 70 | 54.7 |

Table II

| | Before repeated discharge and charge | Capacity (A . hr) After repeated discharge and charge | | | |
|---|---|---|---|---|---|
| Separator | | 100 | 200 | 300 | 400 |
| A (Control) | 4.02 | 3.95 | 3.91 | 3.68 | 0 |
| C (Invention) | 3.94 | 3.91 | 3.86 | 3.65 | 3.43 |
| E " | 3.95 | 3.92 | 3.85 | 3.66 | 3.41 |
| G " | 3.91 | 3.88 | 3.82 | 3.62 | 3.41 |
| J (Control) | 3.52 | 3.48 | 3.41 | 3.20 | 3.05 |
| X " | 3.75 | 3.70 | 3.57 | 3.13 | 2.56 |
| Y " | 3.70 | 3.66 | 3.64 | 3.42 | 3.20 |

EXAMPLE 2

A polyethylene terephthalate having an intrinsic viscosity of 0.63 was extruded by a spirit-spinning apparatus through an orifice into the atmosphere. The filaments having 1 to 5 microns diameter so formed were cut into 2 mm length.

A sheet (K) having a basis weight of 100 g/m² and a thickness of 0.25 mm was manufactured from the polyethylene terephthalate fibers in a manner similar to that in Example 1. The sheet was impregnated with a 5% solution in benzene of methylhydrogenpolysiloxane. After being dried the sheet was heated at 150° C for 3 minutes to obtain a sheet (L) containing 9.8% of the organopolysiloxane.

Using each of the sheets (K) and (L) and a commercially available phenolformaldehyde resin impregnated cellulose separator (Z) of 0.8 mm thick, a lead-acid storage battery having a capacity of 4A.hr at a 10 hours rate was constructed in a manner similar to that in Example 1. The capacity of each battery was tested before and after repeated discharge and charge in a manner similar to that in Example 1. The results were as shown in Table III, below.

Table III

| | Before repeated discharge and charge | Capacity (A . hr) After repeated discharge and charge | | | |
|---|---|---|---|---|---|
| Separator | | 100 | 200 | 300 | 400 |
| K (Control) | 3.62 | 3.60 | 3.55 | 3.38 | 0 |
| L (Invention) | 3.63 | 3.61 | 3.58 | 3.51 | 3.45 |
| Z (Control) | 3.25 | 3.16 | 3.06 | 2.53 | 0 |

EXAMPLE 3

Regenerated cellulose rayon filaments of 1.5 denier prepared in a known manner were cut into 3 mm lengths. A sheet (M) having a basis weight of 160 g/m² and a thickness of 0.5 mm was manufactured from the fibers in a manner similar to that in Example 1. The sheet was impregnated with an organopolysiloxane in a manner similar to that in Example 1 and heated at 180° C for 1 minute to obtain a sheet (N) containing 10.5% of the organopolysiloxane. The sheets (M) and (N) were tested for their performances. The results were as shown in Table IV, below.

Table IV

| Separator | Electrical resistance ($\Omega/cm^2$/sheet) | Oxidation and acid resistance (hr) | Before repeated discharge & charge | Capacity (A . hr) After repeated discharge & charge | | |
|---|---|---|---|---|---|---|
| | | | | 200 | 400 | 600 |
| M (Control) | 0.20 | 0.7 | 3.84 | 3.61 | 2.51 | 0 |
| N (Invention) | 0.28 | 45.3 | 3.83 | 3.62 | 3.27 | 3.05 |

EXAMPLE 4

Polyacrylonitrile fibers of 12 micron diameter were woven into a plain fabric (O). The fabric was impregnated with a solution in benzene containing 5% of phenylmethylsilicone varnish and 0.1% of zinc stearate, squeezed by a mangle, dried and, then heated at 150° C for 3 minutes. The fabric (P) so treated contained 7.8% of the organopolysiloxane.

Using as a spacer each of the fabrics (O) and (P) and a glass fiber mat, and as a separator each of the sheets (A) and (E) set forth in Example 1, a lead-acid storage battery having a capacity of 4 A.hr at a 10 hours rate was constructed in a manner similar to that in Example 1. The capacity of each battery was tested before and after repeated discharge and charge in a manner similar to that in Example 1. The results were as shown in Table V, below.

Table V

| Spacer/separator | Capacity (A . hr) | | | | |
|---|---|---|---|---|---|
| | Before repeated discharge and charge | | After repeated discharge and charge | | |
| | At 8 A discharge | At 1 A discharge | 200 | 400 | 600 |
| P/A (Invention) | 1.85 | 3.95 | 3.88 | 3.37 | 2.51 |
| O/A (Control) | 1.81 | 3.93 | 3.86 | 2.43 | 0 |
| Glass mat/A (Control) | 1.83 | 3.93 | 3.84 | 0 | — |
| P/E (Invention) | 1.87 | 3.94 | 3.86 | 3.58 | 3.25 |

What is claimed is:

1. A lead-acid storage battery having porous separators placed between the alternate positive and negative plates in the cells thereof, characterized in that each separator, placed in close contact with the surface of the positive plate, is composed of a fibrous structure in the form of a sheet of organic high polymer fibers which structure is impregnated with 1 to 50% by weight, based on the weight of the sheet not yet impregnated, of an organopolysiloxane and then cured.

2. The lead-acid storage battery according to claim 1 wherein said fibrous structure is a paper of acid- and oxidation-resistant organic high polymer fibers of no less than approximately 5 microns average diameter, said papers being impregnated with said amount of an organopolysiloxane and then cured.

3. The lead-acid storage battery according to claim 1 wherein said organic high polymer fibers are cured phenolformaldehyde resin fibers of 1 to 5 microns in diameter.

4. The lead-acid storage battery according to claim 1 wherein said separators are retainers or spacers each placed in close contact with the positive plates and composed of nonwoven fabrics, or woven or knitted fabrics or organic high polymer fibers, said fabrics being impregnated with said amount of an organopolysiloxane and then cured.

5. The lead-acid storage battery according to claim 1 wherein said amount of an organopolysiloxane is within the range of 3 to 30% by weight based on the weight of the fibrous structure not yet impregnated therewith.

6. The lead-acid storage battery according to claim 1 wherein said fibrous structure impregnated with an organopolysiloxane is cured by maintaining it at a temperature of 120° C to 200° C for a period of 30 seconds to 10 minutes.

7. The lead-acid storage battery according to claim 1 wherein said organopolysiloxane is a silicone oil consisting essentially of methylhydrogenpolysiloxane or a mixture of methylhydrogenpolysiloxane and dimethylpolysiloxane.

* * * * *

UNITED STATES PATENT OFFICE
CERTIFICATE OF CORRECTION

Patent No. 3,989,545   Dated 11/2/76

Inventor(s) Takashi Ito & Hironori Matsui

It is certified that error appears in the above-identified patent and that said Letters Patent are hereby corrected as shown below:

Column 1, Line 37, "442,271" should be --441,271--.

Column 2, Line 17, "or" should be --of--.

Signed and Sealed this

Eleventh Day of January 1977

[SEAL]

Attest:

RUTH C. MASON
*Attesting Officer*

C. MARSHALL DANN
*Commissioner of Patents and Trademarks*